United States Patent
Lin et al.

(10) Patent No.: US 7,633,273 B2
(45) Date of Patent: Dec. 15, 2009

(54) POWER SUPPLY HAVING POWER STATUS INDICATOR WITH REDUCED POWER CONSUMPTION

(75) Inventors: Dong Lin, Shanghai (CN); Yongbin Yang, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 269 days.

(21) Appl. No.: 11/610,647

(22) Filed: Dec. 14, 2006

(65) Prior Publication Data

US 2007/0279017 A1  Dec. 6, 2007

(30) Foreign Application Priority Data

Jun. 6, 2006  (TW) .............................. 95120092 A

(51) Int. Cl.
    *G05F 1/10* (2006.01)
(52) U.S. Cl. ...................................... 323/222; 307/125
(58) Field of Classification Search .................... 363/17, 363/24, 37, 41, 55, 131, 132, 43, 89; 307/64–66, 307/125; 323/282–288, 222, 271, 272
See application file for complete search history.

(56) References Cited

U.S. PATENT DOCUMENTS 5,978,236 A * 11/1999 Faberman et al. ............. 363/37

* cited by examiner

*Primary Examiner*—Rajnikant B Patel

(57) ABSTRACT

What is concerned is a power supply having a power status indicator, in which the power status indicator is powered by a constant voltage source, such as a constant voltage provided by an auxiliary power supply or a reference voltage provided for the internal control circuitry. Or otherwise, the power status indicator is connected in series with a feedback circuit or a protection circuit of the power supply, and the current-limiting resistor thereof is eliminated. In this way, the power consumption of the power supply under the standby mode is reduced, and the energy utilization of the power supply is enhanced.

20 Claims, 4 Drawing Sheets

POWER SUPPLY HAVING POWER STATUS INDICATOR WITH REDUCED POWER CONSUMPTION

FIELD OF THE INVENTION

The present invention is related to a power supply, and more particularly to a power supply having a power status indicator. The present invention proposes a technique for reducing the power consumption of the power status indicator of a power supply under the standby mode, and thereby reducing the overall power consumption of the power supply under the standby mode.

BACKGROUND OF THE INVENTION

A power supply can be configured to operate under a variety of power supply modes, e.g. the normal mode, which indicates that the output voltage of the power supply reaches the voltage level required by the specification; the standby mode, which indicates that the power supply is not connected to any load. In order to meet the requirements for safety regulation, the power supply is generally required to incorporate a power status indicator on the front panel thereof to display the current power status of the power supply. Generally speaking, the power status indicator of a power supply is implemented by a light-emitting device, such as a light-indicator consisted of light-emitting diodes, so that the current power status of the power supply can be displayed in the form of illumination during the operation phase of the power supply.

When the power supply is operating under the standby mode, that is, the power supply is operating under a no-load condition, the power supply will inevitably consume power by itself. The standby power consumption of the power supply generally represents the waste of energy. Nowadays energy saving and environmental protection are important issues to the contemporaries; the increase of power consumption means the increase of energy consumption and the deterioration of environmental pollution. Therefore, the reduction of the standby power consumption can efficiently improve the utilization of energy and reduce the emission of toxic gas. In recent years, some related departments and agencies of the United State and the European Commission have furthered the enhancement of energy efficiency and promulgated associated standards to reach the goal. For example, the department of energy (DOE) and the environmental protection agency (EPA) have jointly ratified an Energy Star Program. The program establishes the standards for a single-output power supply in 2005 as: for a power supply with an output power of 0-10 watts and operating under a no-load condition, the maximum input power can not exceed 0.5 watt; for a power supply with an output power of 10-250 watts and operating under a no-load condition, the maximum input power can not exceed 0.75 watt. Such standards would become stricter in the near future.

FIG. 1 is a circuit block diagram showing a power supply according to the prior art. As shown in FIG. 1, a power supply 100 includes an AC-DC converter stage 101 for converting an input AC voltage Vin into a desired output DC voltage Vo so as to power a load (not shown), and a pulse-width modulation controller (PWM controller) 102 connected to the AC-DC converter stage 101 for controlling the switching operations of the switches located within the AC-DC converter stage 101, so that the output voltage of the AC-DC converter stage 101 can be regulated at a predetermined level. The power supply 100 further includes a feedback circuit 103 connected between the output terminal of the AC-DC converter stage 101 and the PWM controller 102 for detecting the variation on the output voltage of the AC-DC converter stage 101 and sending a feedback control signal to the PWM controller 102 based on the detection results so as to accomplish the regulation for the output voltage. The power supply 100 further includes a protection circuit 104 connected between the output terminal of the AC-DC converter stage 101 and the PWM controller 102 for shutting down the PWM controller 102 in case of abnormality encountered by the output voltage or the output current of the AC-DC converter stage 101, so that the AC-DC converter stage 101 can be protected from being damaged by over-voltage or over-current problems.

The power supply 100 of FIG. 1 also includes a power status indicator 105 connected across the voltage output terminals of the power supply 100. The power status indicator 105 includes a light-emitting diode D and a current-limiting resistor R being connected in series with the light-emitting diode D, as shown in FIG. 1. Generally, the voltage drop of the light-emitting diode D is about 1-2 volts, and the driving current of the light-emitting diode D is as low as several milli-amperes. When the output voltage of the power supply 100 is high, for example, about 10-20 volts, the majority of the power consumption of the power status indicator 105 are contributed by the current-limiting resistor R. When the power supply 100 is operating under the standby mode, the power consumption of the power status indicator 105 represents a non-negligible power loss. Therefore, the current-limiting resistor R is a major contributor to the standby power consumption. It is therefore an important task to achieve a energy-saving power supply by reducing the standby power consumption caused by the current-limiting resistor R. The present invention can address these problems.

SUMMARY OF THE INVENTION

An object of the present invention is to provide a power supply having a power status indicator, which can display the power status of the power supply and reduce the power consumption of the power supply under the standby mode.

According to a preferred embodiment of the present invention, a power supply includes a power converter stage for converting an input power into an output power, and a power status indicator connected across the auxiliary power output terminals of the power supply and being powered by the auxiliary power of the power supply to display the power status of the power supply.

According to another preferred embodiment of the present invention, a power supply includes a power converter stage for converting an input power into an output power, a feedback circuit for detecting the variation on the voltage of the output power and regulating the voltage of the output power based on the detection results, a protection circuit for providing a protection mechanism to the power converter stage when the operation of the power converter stage encounters abnormality, and a power status indicator connected to a voltage output terminal of the power converter stage and connected in series with the feedback circuit or the protection circuit for being driven by the current flowing through the feedback circuit or the protection circuit so as to display the power status of the power supply.

According to another yet preferred embodiment of the present invention, a power supply includes a power converter stage for converting an input power into an output power, a feedback circuit for detecting the variation on the voltage of the output power and regulating the voltage of the output power based on the detection results, a protection circuit for providing a protection mechanism to the power converter stage when the operation of the power converter stage encounters abnormality, and a power status indicator connected to an auxiliary power output terminal and connected in series with the feedback circuit or the protection circuit for being driven by the current flowing through the feedback circuit or the protection circuit so as to display the power status of the power supply.

Now the foregoing and other features and advantages of the present invention will be best understood through the following descriptions with reference to the accompanying drawings, wherein:

DETAILED DESCRIPTION OF THE PREFERRED EMBODIMENT

Several preferred embodiments embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
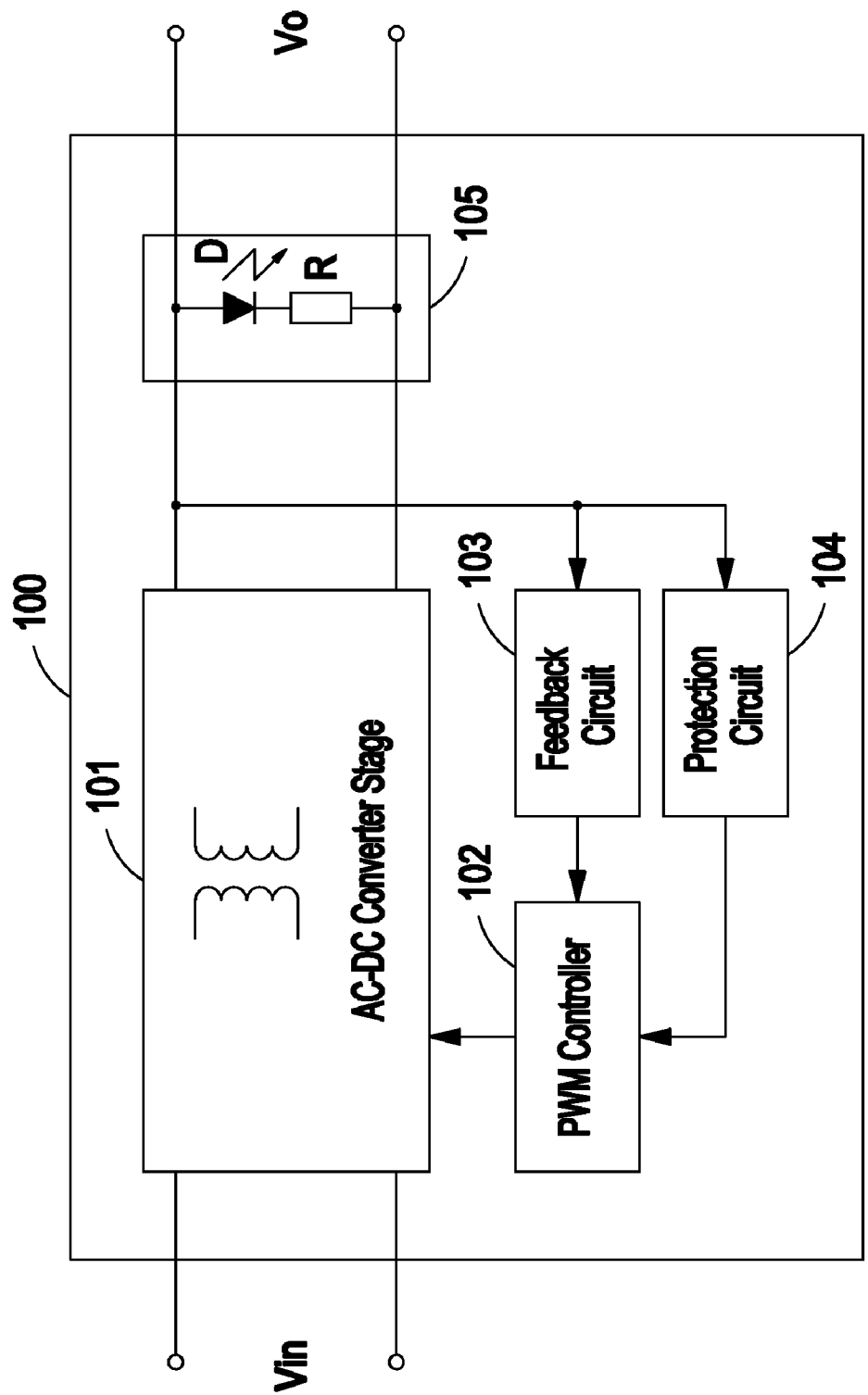
FIG. 1 is a circuit block diagram showing a power supply according to the prior art.
Figure 2:
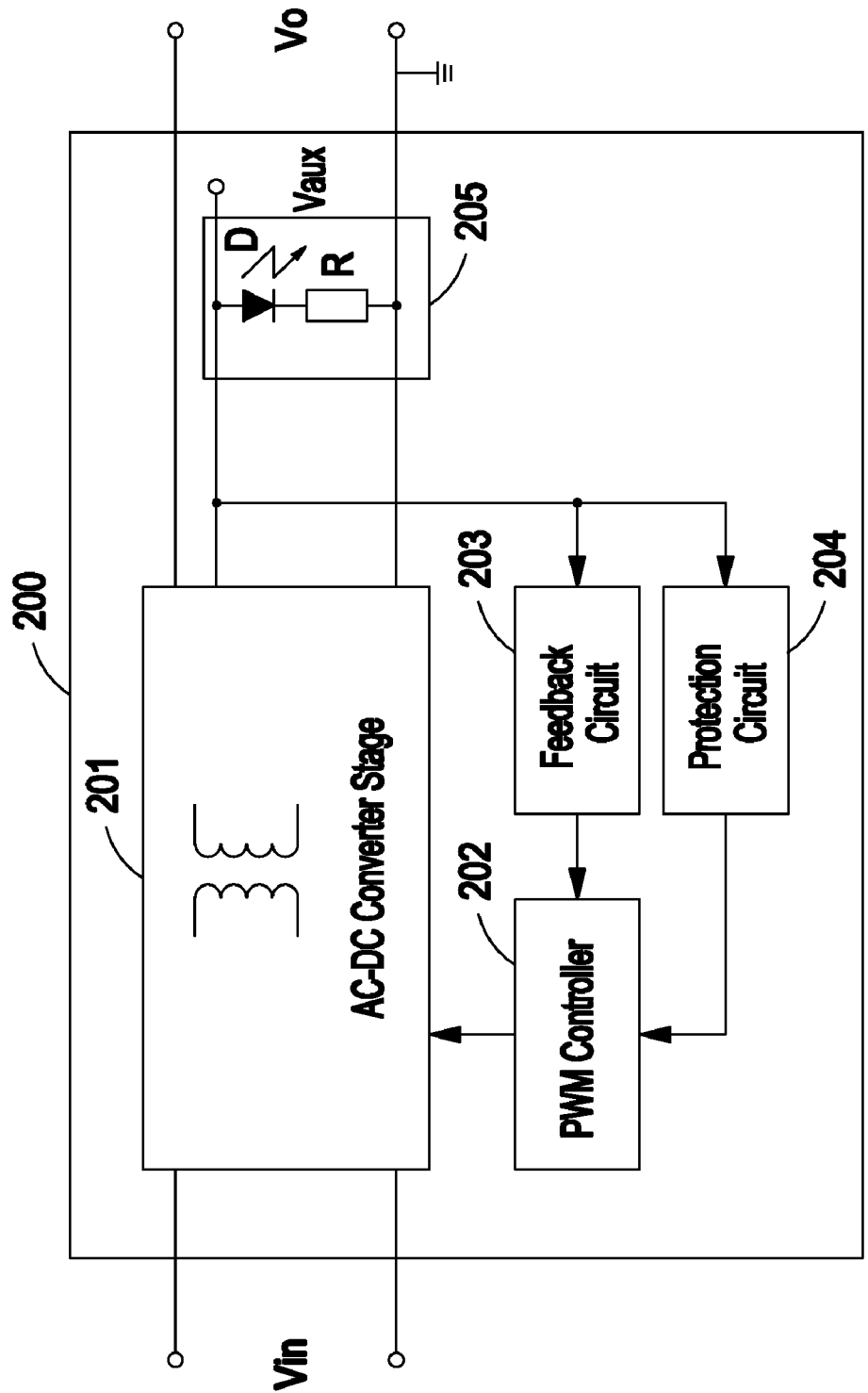
FIG. 2 is a circuit block diagram showing a power supply according to a first preferred embodiment of the present invention.

FIG. 2 is a circuit block diagram of a power supply according to a first preferred embodiment of the present invention. The power supply 200 includes an AC-DC converter stage 201, a PWM controller 202, a feedback circuit 203, and a protection circuit 204, all of which have similar circuit structure and operation theorem with the AC-DC converter stage 101, PWM controller 102, feedback circuit 103, and the protection circuit 104 of FIG. 1. Thus, it is not intended to give details herein. The power supply 200 also includes a power status indicator 205, which is connected across the auxiliary power output terminals of the power supply 200 and implemented by a light-emitting diode D and a current-limiting resistor R being connected in series with the light-emitting diode D. Generally, the AC-DC converter stage 201 would provide an auxiliary power which is produced by storing a portion of the energy provided by an input AC voltage. The auxiliary power always provides a constant voltage lower than the output voltage Vo of the AC-DC converter stage 201 and configured to provide power for the control circuitry, the feedback circuitry and the protection circuitry of the power supply 200, such as the PWM controller 202, the feedback circuit 203 and the protection circuit 204. Therefore, the power status indicator 205 is powered by the output voltage Vaux of the auxiliary power of the AC-DC converter stage 201 in the present embodiment, instead of being powered by the output voltage Vo of the AC-DC converter stage 201. Consequently, the power consumption of the power supply 200 under the standby mode can be greatly reduced. In fact, any constant voltage source that can provide a constant voltage lower than the output voltage Vo can be used as the driving power source for the light-emitting diode D. For example, the reference voltage provided to the control circuitry of the power supply 200 as a criterion for voltage comparison can be used to drive the light-emitting diode D. In the circuit design phase, the series circuit formed by the light-emitting diode D and the current-limiting resistor R is connected across the constant voltage source and the ground terminal.

Figure 3:
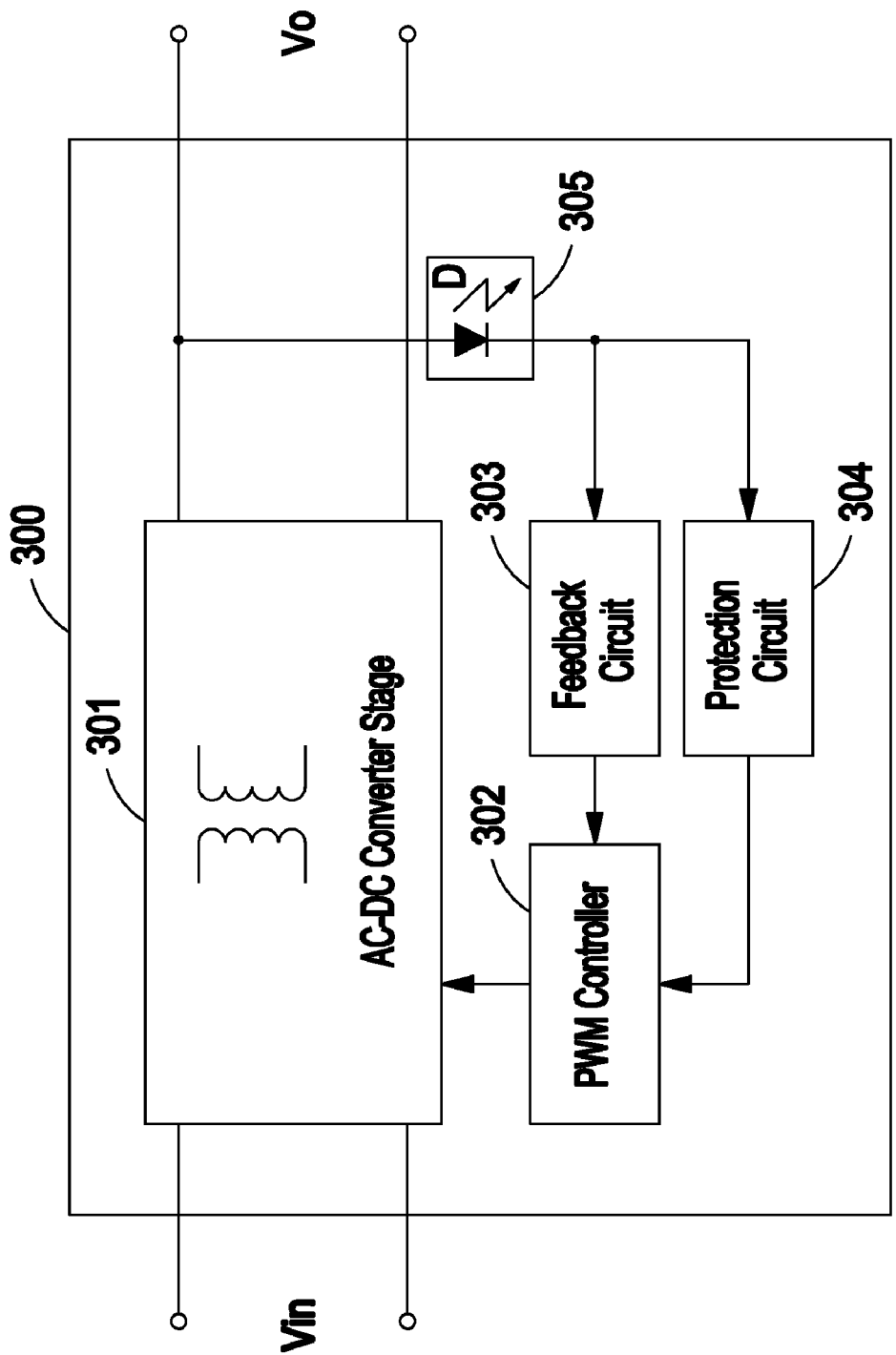
FIG. 3 is a circuit block diagram showing a power supply according to a second preferred embodiment of the present invention.

FIG. 3 is a circuit block diagram of a power supply according to a second preferred embodiment of the present invention. The power supply 300 includes an AC-DC converter stage 301, a PWM controller 302, a feedback circuit 303, and a protection circuit 304, all of which have similar circuit structure and operation theorem with the AC-DC converter stage 101, PWM controller 102, feedback circuit 103, and the protection circuit 104 of FIG. 1. Thus, it is not intended to give details herein. The power supply 300 also includes a power status indicator 305, which is connected to a voltage output terminal of the power supply 300 and connected in series with the feedback circuit 303 and the protection circuit 304 and implemented by a light-emitting diode D. Compared with the power supply of FIG. 1, it can be understood that the power status indicator 305 of FIG. 3 eliminates the current-limiting resistor which is connected in series with the light-emitting diode D, and uses the small current (in the magnitude of several mill-amperes) flowing through the feedback circuit 303 and the protection circuit 305 to drive the light-emitting diode D. Through the removal of the current-limiting resistor that is connected in series with the light-emitting diode D, the power consumption of the power supply 300 under the standby mode can be further reduced. Alternatively, the light-emitting diode D can be independently connected in series with the feedback circuit 303 or the protection circuit 304, and thereby attaining the same performance.

Figure 4:
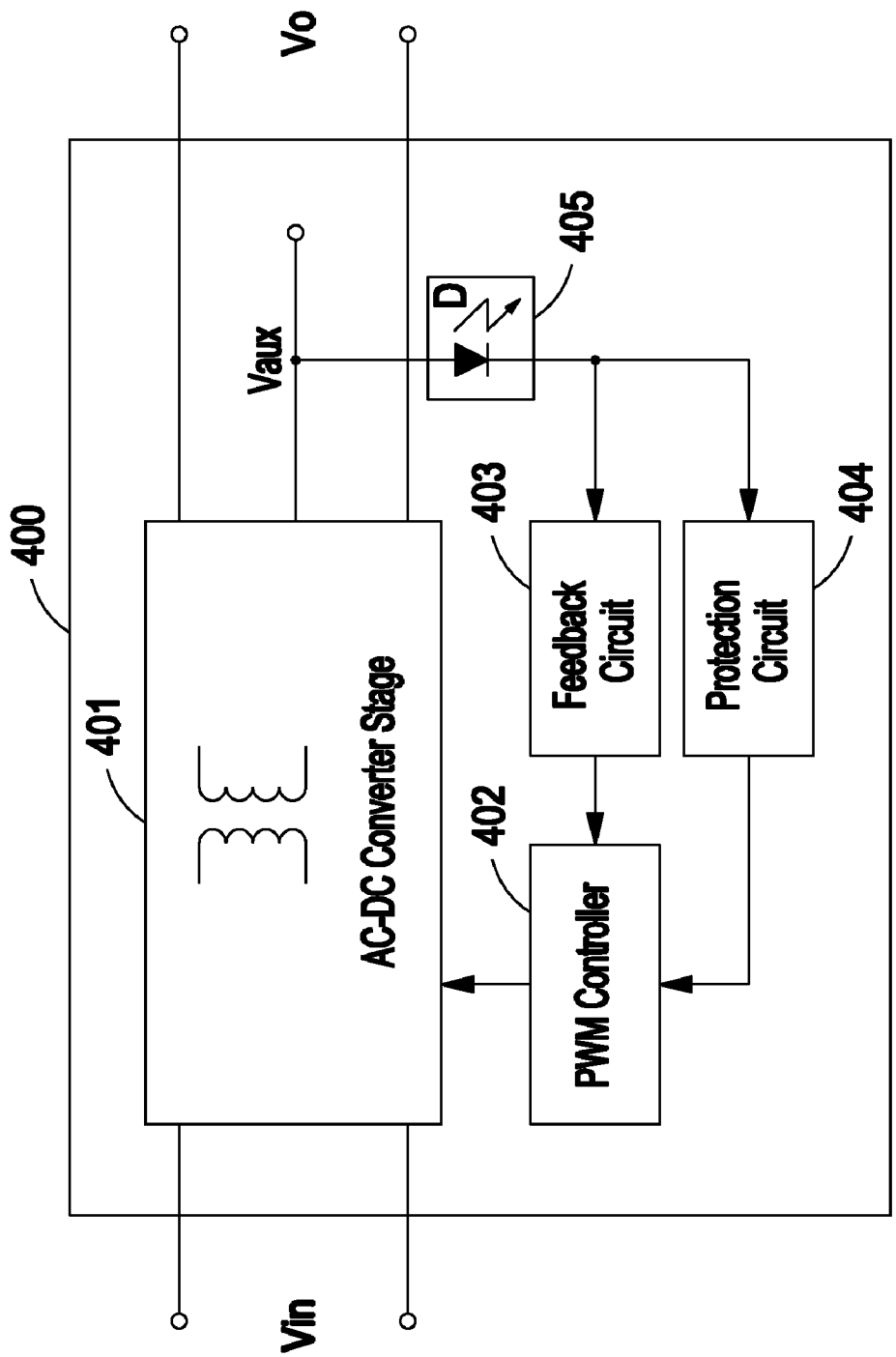
FIG. 4 is a circuit block diagram showing a power supply according to a third preferred embodiment of the present invention.

FIG. 4 is a circuit block diagram of a power supply according to a third preferred embodiment of the present invention. The power supply 400 includes an AC-DC converter stage 401, a PWM controller 402, a feedback circuit 403, and a protection circuit 404, all of which have similar circuit structure and operation theorem with the AC-DC converter stage 101, PWM controller 102, feedback circuit 103, and the protection circuit 104 of FIG. 1. Thus, it is not intended to give details herein. The power supply 400 also includes a power status indicator 405, which is connected to an auxiliary power output terminal of the power supply 400 and connected in series with the feedback circuit 303 or the protection circuit 304 and implemented by a light-emitting diode D. Compared with the power supply of FIG. 1, it can be understood that the power status indicator 405 of FIG. 4 eliminates the current-limiting resistor that is connected in series with the light-emitting diode D, and uses the small current (in the magnitude of several mill-amperes) flowing through the feedback circuit 403 or the protection circuit 404 to drive the light-emitting diode D. Furthermore, the feedback circuit 403 and the protection circuit 404 are powered by the output voltage Vaux of the auxiliary power of the power supply 400 instead of being powered by the output voltage Vo of the AC-DC converter stage 401, and thereby reducing the current for driving the light-emitting diode D. Through the removal of the current-limiting resistor that is connected in series with the light-emitting diode D and the arrangement of powering the power status indicator 405 with the output voltage Vaux of the auxiliary power of the power supply 400, the power consumption of the power supply 400 under the standby mode can be further reduced. Alternatively, the light-emitting diode D can be independently connected in series with the feedback circuit 403 or the protection circuit 404, and thereby attaining the same performance.

In conclusion, the inventive power supply includes a power status indicator which can be powered by an auxiliary power within the power supply or connected with a feedback circuit and a protection circuit without the serially-connected current-limiting resistor. In this manner, the power consumption of the power supply under the standby mode can be reduced and the energy utilization of the power supply can be enhanced.

Those of skilled in the art will recognize that these and other modifications can be made within the spirit and scope of the present invention as further defined in the appended claims.

What is claimed is:

1. A power supply comprising:
   a power converter stage for converting an input power into an output power;
   a signal processing circuit for regulating a voltage or a current of the output power based on the variation of the voltage or the current of the output power;
   a constant voltage source for providing a constant voltage lower than an output voltage of the power converter stage; and
   a power status indicator connected across the constant voltage source and a ground terminal for being powered by the constant voltage provided by the constant voltage source to display the power status of the power supply, wherein the power status indicator is connected in series with the signal processing circuit, and configured to be driven by the current flowing through the signal processing circuit to display the power status of the power supply.

2. The power supply according to claim 1 wherein the power converter stage is an AC-DC converter stage.

3. The power supply according to claim 1 wherein the constant voltage source is an auxiliary power supply output.

4. The power supply according to claim 1 wherein the constant voltage source is a reference voltage for a control circuitry of the power converter stage as a criterion for voltage comparison.

5. The power supply according to claim 1 wherein the power status indicator comprises:
   a light-emitting device for emitting lights to display the power status of the power supply; and
   a current-limiting resistor connected in series with the light-emitting device for limiting the current flowing through the light-emitting device.

6. The power supply according to claim 5 wherein the light-emitting device comprises a light-emitting diode.

7. A power supply comprising:
   a power converter stage for converting an input power into an output power;
   a signal processing circuit for regulating a voltage or a current of the output power based on the variation on the voltage or the current of the output power; and
   a power status indicator connected to an output terminal of the power converter stage and connected in series with the signal processing circuit, and configured to be driven by the current flowing through the signal processing circuit to display the power status of the power supply.

8. The power supply according to claim 7 wherein the signal processing circuit comprises a feedback circuit.

9. The power supply according to claim 7 wherein the signal processing circuit comprises a pulse-width modulation controller.

10. The power supply according to claim 7 wherein the signal processing circuit comprises a protection circuit.

11. The power supply according to claim 7 wherein the power converter stage is an AC-DC converter stage.

12. The power supply according to claim 7 wherein the power status indicator comprises a light-emitting device for emitting lights to display the power status of the power supply.

13. The power supply according to claim 12 wherein the light-emitting device comprises a light-emitting diode.

14. A power supply comprising:
    a power converter stage for converting an input power into an output power;
    a signal processing circuit for regulating a voltage or a current of the output power based on the variation on the voltage or the current of the output power;
    an auxiliary power supply for converting the input power into an auxiliary power; and
    a power status indicator connected to an output terminal of the auxiliary power supply and connected in series with the signal processing circuit, and configured to be driven by the current flowing through the signal processing circuit to display the power status of the power supply.

15. The power supply according to claim 14 wherein the signal processing circuit comprises a feedback circuit.

16. The power supply according to claim 14 wherein the signal processing circuit comprises a pulse-width modulation controller.

17. The power supply according to claim 14 wherein the signal processing circuit comprises a protection circuit.

18. The power supply according to claim 14 wherein the power converter stage is an AC-DC converter stage.

19. The power supply according to claim 14 wherein the power status indicator comprises a light-emitting device for emitting lights to display the power status of the power supply.

20. The power supply according to claim 19 wherein the light-emitting device comprises a light-emitting diode.

* * * * *

UNITED STATES PATENT AND TRADEMARK OFFICE
CERTIFICATE OF CORRECTION

PATENT NO. : 7,633,273 B2 Page 1 of 1
APPLICATION NO. : 11/610647
DATED : December 15, 2009
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 270 days.

Signed and Sealed this

Second Day of November, 2010

David J. Kappos
*Director of the United States Patent and Trademark Office*